(12) United States Patent
Eggert

(10) Patent No.: US 9,667,716 B2
(45) Date of Patent: *May 30, 2017

(54) METHOD AND APPARATUS FOR SHARING CONTENT VIA ENCODED DATA REPRESENTATIONS

(71) Applicant: NOKIA TECHNOLOGIES OY, Espoo (FI)

(72) Inventor: Jens Eggert, Helsingborg (SE)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,701

(22) Filed: Jun. 3, 2015

(65) Prior Publication Data
US 2015/0271258 A1 Sep. 24, 2015

Related U.S. Application Data

(63) Continuation of application No. 13/745,110, filed on Jan. 18, 2013.

(51) Int. Cl.
| | | |
|---|---|---|
| *G06F 17/00* | (2006.01) | |
| *H04L 29/08* | (2006.01) | |
| *G06F 17/30* | (2006.01) | |
| *G06K 19/06* | (2006.01) | |

(52) U.S. Cl.
CPC ...... *H04L 67/104* (2013.01); *G06F 17/30002* (2013.01); *G06F 17/3089* (2013.01); *G06K 19/06112* (2013.01)

(58) Field of Classification Search
CPC ............ G06Q 20/3274; G06Q 20/3276
USPC ................ 235/375, 379, 380, 382
See application file for complete search history.

(56) References Cited

U.S. PATENT DOCUMENTS

| | | | |
|---|---|---|---|
| 2009/0281904 A1 | 11/2009 | Pharris | |
| 2011/0101086 A1* | 5/2011 | Yach | G06Q 10/10 235/375 |
| 2011/0295502 A1 | 12/2011 | Faenger | |
| 2012/0199647 A1 | 8/2012 | Hwang et al. | |

FOREIGN PATENT DOCUMENTS

WO 2012135563 A1 10/2012

OTHER PUBLICATIONS

Hines, "QR Codes Are the New Business Card", retrieved from http://cellphones.about.com/od/tipstricks/a/qr-codes-blackberry.htm, dated Oct. 30, 2012, 1 page.

(Continued)

*Primary Examiner* — Jamara Franklin
(74) *Attorney, Agent, or Firm* — Ditthavong & Steiner, P.C.

(57) ABSTRACT

An approach is provided for a more efficient and user friendly mechanism for sharing content among users. The approach includes determining a first request from a first device for sharing at least one content item; causing, at least in part, a generation of a graphical code representing, at least in part, the at least one content item, wherein the graphical code is unique to the first request; causing, at least in part, a presentation of the graphical code at the first device; and causing, at least in part, a transfer of the at least one content item from the first device to a second device based, at least in part, on a scanning of the graphical code by the second device.

20 Claims, 11 Drawing Sheets

(56) References Cited

OTHER PUBLICATIONS

Saxton, "How to Send a JPEG File Using QR Code", retrieved from http://www.ehow.co.uk/how_8687153_send-file-using-qr-code.html, dated Oct. 30, 2012, 3 pages.
Droidla, "Encode any image as a QR Code!", retrieved from http://qrdroid.com/blog/encode-any-image-as-a-qr-code.html>, dated Jul. 19, 2011, 4 Pages.
Send to QR Code—Data Sharing Between Mobile Devices, McAkins Online, retrieved from <http://mcakins.wordpress.com/2012/10/25/send-to-qr-code-data-sharing-between-mobile-devices/>, dated Oct. 12, 2012, 3 pages.

* cited by examiner

METHOD AND APPARATUS FOR SHARING CONTENT VIA ENCODED DATA REPRESENTATIONS

RELATED APPLICATIONS

This application is a continuation application of co-pending U.S. application Ser. No. 13/745,110, filed Jan. 18, 2013, the entire disclosure of which is hereby incorporated by reference herein.

BACKGROUND

Service providers (e.g., wireless, cellular, etc.) and device manufacturers are continually challenged to deliver value and convenience to consumers by, for example, providing compelling network services. One area of interest is providing the capability for users to share various content items with other users by utilizing various devices, methods, and available services. In various situations, one user may share a content item (e.g., a picture) with one or more other users via one or more local proximity-based communication mechanisms; however, such sharing may be time consuming and difficult where the user may have to establish multiple communication channels/sessions with the other users, or that not all user devices are capable of proximity-based communication. Alternatively, users may share their content items via available service providers; however, this approach may require a user to upload the content for sharing to a service provider network access point (e.g., a website, a social network site), provide the access point information to other users, where the other users would have to login to the access point for accessing the content. Therefore, service providers and device manufacturers face significant challenges in providing more efficient and user friendly mechanisms for sharing content.

SOME EXAMPLE EMBODIMENTS

Therefore, there is a need for a more efficient and user friendly mechanism for sharing content among users.

According to one embodiment, a method comprises determining a first request from a first device for sharing at least one content item. The method also comprises causing, at least in part, a generation of a graphical code representing, at least in part, the at least one content item, wherein the graphical code is unique to the first request. The method further comprises causing, at least in part, a presentation of the graphical code at the first device. Additionally, the method comprises causing, at least in part, a transfer of the at least one content item from the first device to a second device based, at least in part, on a scanning of the graphical code by the second device.

According to another embodiment, an apparatus comprises at least one processor, and at least one memory including computer program code, the at least one memory and the computer program code configured to, with the at least one processor, cause, at least in part, the apparatus to determine an input for specifying at least one object to associate with at least one content channel. The apparatus is also caused to cause, at least in part, a generation of a graphical code representing, at least in part, the at least one content item, wherein the graphical code is unique to the first request. The apparatus is also caused to cause, at least in part, a presentation of the graphical code at the first device. Additionally, the apparatus is caused to cause, at least in part, a transfer of the at least one content item from the first device to a second device based, at least in part, on a scanning of the graphical code by the second device.

According to another embodiment, a computer-readable storage medium carries one or more sequences of one or more instructions which, when executed by one or more processors, cause, at least in part, an apparatus to determine a first request from a first device for sharing at least one content item. The apparatus is also caused to cause, at least in part, a generation of a graphical code representing, at least in part, the at least one content item, wherein the graphical code is unique to the first request. The apparatus is also caused to cause, at least in part, a presentation of the graphical code at the first device. Additionally, the apparatus is caused to cause, at least in part, a transfer of the at least one content item from the first device to a second device based, at least in part, on a scanning of the graphical code by the second device.

According to another embodiment, an apparatus comprises means for determining a first request from a first device for sharing at least one content item. The apparatus also comprises means for causing, at least in part, a generation of a graphical code representing, at least in part, the at least one content item, wherein the graphical code is unique to the first request. The apparatus further comprises means for causing, at least in part, a presentation of the graphical code at the first device. Additionally, the apparatus comprises means for causing, at least in part, a transfer of the at least one content item from the first device to a second device based, at least in part, on a scanning of the graphical code by the second device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for a more efficient and user friendly mechanism for sharing content among users. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
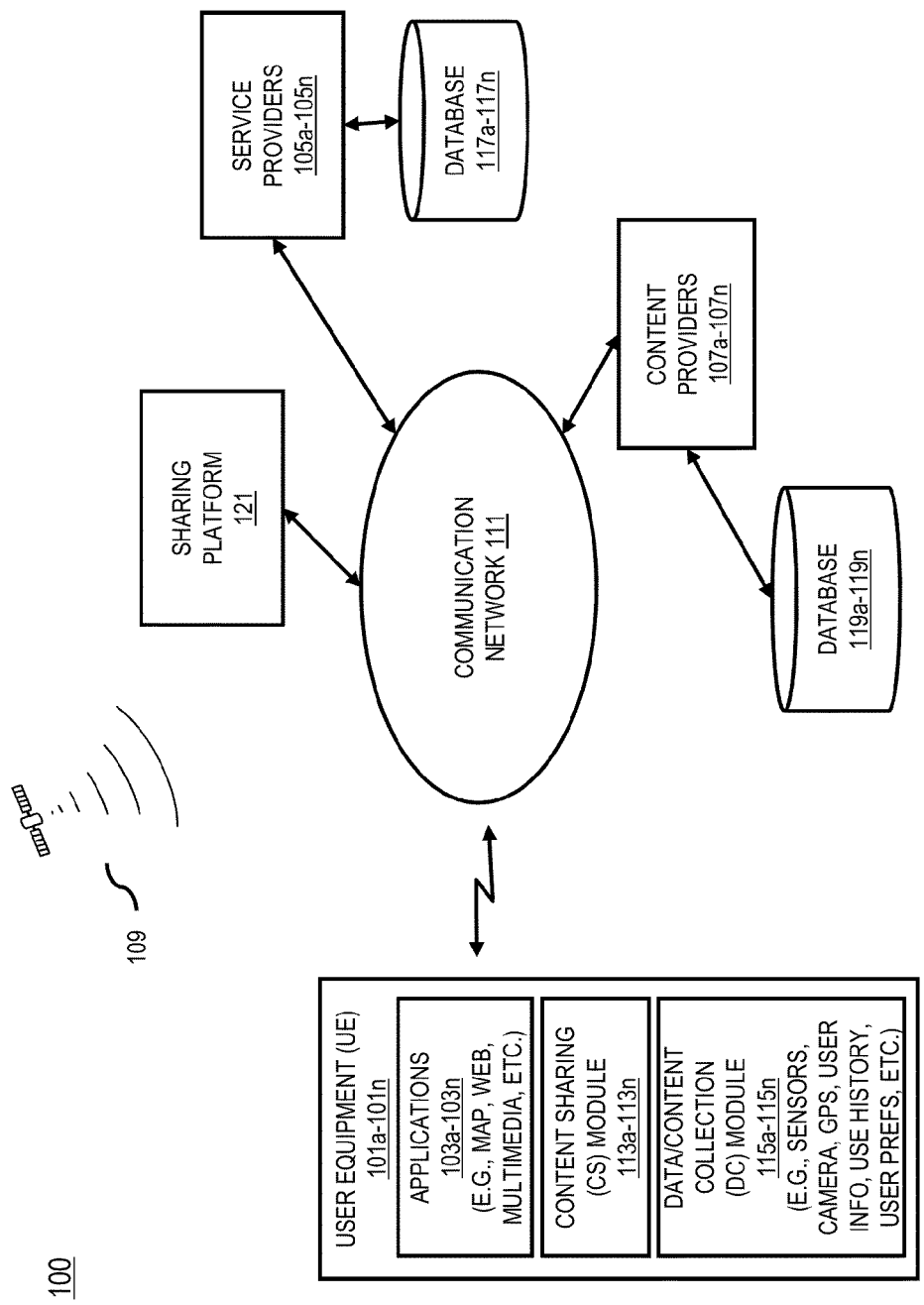
FIG. 1 is a diagram of a system capable of providing for a more efficient and user friendly mechanism for sharing content among users, according to one embodiment.

FIG. 1 is a diagram of a system capable of providing for a more efficient and user friendly mechanism for sharing content among users, according to an embodiment. Traditionally, users may share content items via various mechanisms, for example, via device-to-device communication links, via a network content channel (e.g., a server, a service provider, a website, etc.), and the like. In various scenarios, users may wish to share various types content items, for example on a first device, with other users where local proximity-based sharing (e.g., via Bluetooth®, near-filed-communication (NFC), etc.) may not be available or if available, it may not be efficient (e.g., slow, power intensive, etc.) for transferring the content items (e.g., large files) to another user device. In another scenario, a user may utilize a content channel via a service provider (e.g., Internet website, etc.) to upload the content items for sharing and then provide the content channel information to other users so they may access the content channel and the content items. However, sharing the content items via the traditional mechanisms may require a website address, login identification (ID), a password, and the like in order to upload and download the shared content items. Further, if the content items are to be shared with many users, where each individual user may need to access an individual channel/access point, the process may be overwhelming and redundant for a user intending to share his content items with the many users. Therefore, service providers face significant challenges in providing a more efficient and user friendly mechanism for sharing content among users.

To address, at least these problems, a system 100 of FIG. 1 introduces the capability of a more efficient and user friendly mechanism for sharing content among users. More specifically, users in different settings may wish to utilize a simple process to quickly share various content items, for example, pictures, videos, audio, documents, game applications, and the like, where the process may include few simple steps without necessarily having to perform all of the traditional steps. In one scenario, a first user at an event (e.g., a summer party) may capture several pictures/videos during the event where a second user would like to receive one or more of the pictures/videos available on the first user's device (first device). In one embodiment, the first user may select a content item (e.g., a picture, a video, etc.) for sharing with the second user, wherein an application on the first user device may generate a request for a service provider (e.g., via a cloud service, via the Internet, etc.) to transfer to and/or present at the second user's device (second device) the selected content item. In one embodiment, the service provider may generate an encoded data representation code (a marker); for example a graphical barcode, a quick response (QR) code, etc., which may be displayed at the first device (e.g., on a display.) In another embodiment, the first device may partially or completely generate the marker (e.g., a QR code), wherein the marker is displayed at the first device. In one embodiment, the second user may utilize the second device to scan (e.g., via an onboard camera) a marker displayed at the first device, whereby the scanning may initiate a request from the second device and/or from the first device to a service provider to transfer to and/or present at the second device the content item. In various embodiments, the first user and/or the second user may interact with a content item on their respective devices whereby the interactions may transfer to the other device. In one embodiment, a marker is unique to a content item. In one embodiment, the marker is associated with a uniform resource locator (URL.)

In various scenarios, users may utilize capabilities of the system 100 to easily share various content items available at one device with one or more other devices, wherein the sharing process is easy and user friendly.

In one embodiment, the system 100 determines a first request from a first device for sharing at least one content item. In one embodiment, a service provider may receive a request from a first device where a user of the first device wishes to share a content item with another user via a second device. For example, the first user selects a photo from a photo album on a first device and/or at a remote storage and utilizes an application and/or a user interface option on the first device to indicate that he wishes to share the photo with a second user (e.g., via a second device.) In one embodiment, the request may be received at a sharing platform, which may facilitate sharing of various content items among a plurality of users via one or more service providers 105 and/or content providers 107 (e.g., cloud services.) In one embodiment, a service provider 105 may be predefined at a user device and/or may be defined by the service platform facilitating the sharing.

In one embodiment, the system 100 causes, at least in part, a generation of a graphical code representing, at least in part, the at least one content item, wherein the graphical code is unique to the first request. In one embodiment, the graphical code includes a one dimensional graphical code, a two dimensional graphical code, or a combination thereof. In one embodiment, a sharing platform and/or a service provider may generate or cause a generation of a unique graphical code (a marker) (e.g., a bar code, a QR code, a numerical pattern, etc.) representing the content item to be shared. In one embodiment, one or more applications and/or modules at a first user device may generate a complete or a partial marker and further cause a displaying on the first device. In various embodiments, the graphical code representation (the marker) may be of various types of one dimensional and/or two dimensional barcodes, which may include encoded data associated with an object (e.g., physical, virtual, digital, etc.), wherein the encoded data may be decoded by a decoding device. In one example, a one dimensional barcode may be a series of vertical black lines with white spaces in between, which represent encoded alphanumeric data that may be scanned and decoded by a device capable of doing so (e.g., a barcode reader.) Further, the two dimensional barcodes (also referred to as a matrix barcode) may include a range of graphical code representations (e.g., lines, dots, shapes, patterns, etc. in x-axis and y-axis directions) that may include encoded alphanumeric data associated with an object, wherein the data may indicate a website URL, a map geo-location, a contact information, text notes, product identification, and the like. For example, the two dimensional barcodes may include various versions of graphical representations in color, grey scale, and black and white, where the graphical pattern may be in a variety of geometrical forms and dimensions. In one embodiment, a barcode may include an alphanumeric pattern which may be arranged in a matrix format. In one embodiment, the graphical code includes a URL reference/address associated with one or more content items.

In one embodiment, the system 100 causes, at least in part, a presentation of the graphical code at the first device. In one embodiment, a service provider may generate the graphical code and cause for it to be presented/displayed at the first device. In one embodiment, a service provider may transmit a code (e.g., an alphanumeric code) to the first device, wherein the first device may further utilize the code to generate and display a graphical code at the first device. In one embodiment, the first device may partially or completely generate and display the graphical code at the first device.

In one embodiment, the system 100 causes, at least in part, a transfer of the at least one content item from the first device to a second device based, at least in part, on a scanning of the graphical code by the second device. In one embodiment, a first device displays a graphical code and a second device scans and/or captures an image of the graphical code, for example, via a barcode scanner and/or via a camera device on the second device. In one embodiment, one or more components of the system 100 (e.g., a service provider, a service platform, etc.) may receive a scanned/captured graphical code from the second device. In one embodiment, the graphical code may be partially or completely decoded by the second device, for example, one or more applications on the second device may decode one or more portions of the graphical code and submit the decoded data to the one or more components of the system 100. In one instance, the second device may decode a graphical code and utilize the decoded data to perform one or more actions, for example, contact a certain service provider (e.g., Flickr®, Google®, Yahoo®, etc.), or connect to a certain network resource (e.g., a network server at a certain IP address), use an internet browser to connect to a certain website, and the like. In one embodiment, the at least one content item is stored at the first device, at a server, or a combination thereof. In one embodiment, a service provider may transfer to and/or present at the second device, the content item which the first device intended to share with the second device. In one embodiment, a service provider may request the content item from the first device to directly transfer to and/or present at the second device. In one embodiment, the service provider may request for and store the content item at the service provider before transferring to and/or presentation at the second device.

In one embodiment, the graphical code includes one or more information items associated with the first device, with the server, or a combination thereof. In one embodiment, the first device and/or a service provider may determine and include one or more information items associated with the first device, with the user of the first device, with a service provider associated with the first device and/or the first user, and the like. For example, the graphical code may indicate a type of the first device, who the user of the first device is, a server where the content item may be stored at, a server which may be transferring/presenting the content item, and the like.

In one embodiment, the system 100 determines one or more actions at the first device. In one embodiment, an application at the first device and/or a service provider may determine an action by a user of the first device associated with a content item. For example, a first user at the first device may select one or more additional content items at the first device to be shared with the second device while a first content item is being transferred to and/or presented at a second device. In one example, the first user may browse through additional content items at the first device (e.g., more photos in an album, etc.), which may also be shared with the second user via the second device.

In one embodiment, the system 100 causes, at least in part, a presentation of the at least one content item at the second device based, at least in part, on the one or more actions at the first device. For example, the application at the first device and/or the service provider may present the additional content items at the second device.

In one embodiment, the system 100 causes, at least in part, a presentation of a user interface application at the first device, at the second device, or a combination thereof. In one embodiment, a service provider, in response to a request for sharing a content item from a first device to a second device, may present a UI application at the first device and/or at the second device. In one embodiment, the service provider may cause one or more applications at the first device and/or at the second device to present the UI application.

In one embodiment, the system 100 determines one or more inputs at the first device, at the second device, or a combination thereof. In one embodiment, the service provider and/or one or more applications at the first device and/or at the second device may determine one or more inputs, for example, from a first user, from a second user, from one or more applications, and the like, which may select one or more content items for sharing, for transfer, for presentation, and the like.

In one embodiment, the system 100 causes, at least in part, the transfer, the presentation, or a combination thereof of the at least one content item based, at least in part, on the one or more inputs. In one embodiment, a service provider may effectuate the transfer and/or presentation of one or more content items from a first device to a second device based, at least in part, on one or more inputs from the first user and/or the second user. For example, the first user may wish to discontinue sharing of content items, or to add more content items to a current sharing session, and the like. In one example, the second user may wish to receive additional content items from the first device, or request for a re-transmission of a content item, or request for a different version (e.g., a different file size, a different format, etc.) of a content item, and the like.

In one embodiment, the system 100 causes, at least in part, the transfer, the presentation, or a combination thereof of the content item to one or more other devices at one or more different geo-locations. In one embodiment, a service provider may receive a request from a first user and/or from a second user for sharing a content item with one or more users/devices that may be located at a different geo-location than the first and/or the second device. For example, the content item may be shared with a third device (e.g., a monitor, a television set, etc.) which may be in communication with the system 100. In one embodiment, the content item may be transferred and/or presented to one or more devices at different locations at one or more different times.

In one embodiment, the system 100 processes and/or facilitates a processing of the graphical code for determining contextual information associated with the at least one content item, wherein the transfer, the presentation, or a combination thereof of the at least one content item to the second device is based, at least in part, on the contextual information. In one embodiment, a service provider may decode the graphical code to determine contextual data associated with a content item to be shared, wherein the contextual data may include metadata, content type, and the like. In one embodiment, a first device may determine the contextual data. In one embodiment, a second device may process the graphical code and determine the contextual data. In one embodiment, a service provider, a first device, and/or a second device may effectuate the transfer to and/or presentation of the content item at the second device based, at least in part, on the contextual data. For example, the contextual data may indicate that the content item may be for private use, may not be shared, may be shared with certain other users, file size may be too large for transfer/presentation via a given method, and the like.

In one embodiment, the system 100 causes, at least in part, the transfer, the presentation, or a combination thereof of the at least one content item via a private content sharing channel, a non-private content sharing channel, or a combination thereof based, at least in part, on the contextual information. In one embodiment, a first device, a second device, and/or a service provider may determine to transfer and/or present a content item via a private content sharing and/or communication channel. In one embodiment, the content item may be shared with a public, a semi-private, secure, or a combination thereof sharing and/or communication channel. In one embodiment, the contextual data may be utilized for determining the type of sharing and/or communication channel to be utilized for the transfer and/or presentation of the content item at the second device. For example, content items including privacy information may be determined for sharing via a private and/or secure channel. In one embodiment, a first user initiating the sharing may identify/request a certain channel for sharing a certain content item.

In various embodiments, one or more users may utilize capabilities and benefits of the system 100 to easily share various content items with one or more other users, wherein the process is simple, efficient, user-friendly, and conducive to sharing content items by utilizing an encoded data (e.g., graphical) representation for initiating the sharing process via one or more service providers and/or platforms.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, content sharing, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), a sharing platform 121 (see discussion in FIG. 3), and/or with other components of the system 100 directly and/or via communication network 111. In one embodiment, the UEs 101 may include content sharing modules 113a-113n (also collectively referred to as the CS module 113.) In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the CS module 113 and a camera module may be utilized to scan, capture, process, submit, analyze, append, etc. encoded data (e.g., graphical) representations for sharing various content items; for example, pictures, videos, audio recordings, documents, and the like. In various embodiments, the CS module 113 may include various components for capturing various representations of various types of content items, for example, video, audio, graphical codes (e.g., barcodes) scanner, and the like. In various embodiments, the graphical codes include various types of one dimensional and two dimensional codes. For example, the barcodes may include encoded linear bars, stacked bars, in color code, quick response (QR) code, matrix format code, in various orientations, and the like, wherein the graphical codes may be standardized. In one embodiment, the CS module 113 may include various predefined parameters and configuration information associated with a user, a user device, one or more service providers, one or more content providers, and the like. In one embodiment, the CS module 113 may present one or more options for a user to select one or more content items from a list of content items available to the user for sharing. For example, a first user may utilize the CS module 113 on a first device to select a content item by continuously selecting (e.g., pressing on) a UI feature to highlight/select the content item. Further, the CS module 113 may cause a transmission of a request for sharing the one or more selected content items to one or more service providers 105 and/or content providers 107, which may generate one or more encoded data representations (e.g., a barcode, a QR code, etc.) Furthermore, the one or more encoded data representations may be transmitted back to the first device, wherein the encoded data may contain one or more information items associated with one or more service providers 105, one or more content providers 107, and the like, whereby the one or more content items may be shared. In one embodiment, the CS module 113 at the first device may generate the one or more encoded data representations, which may contain one or more information items associated with the one or more content items, the one or more service providers 105, the one or more content providers 107, and/or the sharing platform 121. In one embodiment, a second user may utilize a second device to scan and/or capture an image of an encoded data representation for causing a request for one or more content items to be transferred to and/or presented at the second device. For example, a first device may display a barcode that is associated with a content item and a second device may scan the barcode for requesting to receive the content item via one or more service providers.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user for establishing a content channel wherein one or more users may share content items among the users. In one embodiment, the service provider 105 may utilize various algorithms, software applications, modules, hardware, firmware, and the like for processing, recognizing, detecting, comparing, and the like content items (e.g., media items) that may be associated with a content channel and use a processed content item for authenticating one or more users wishing to access the content channel if the users submit substantially same content item as a key for accessing the content channel.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, and the content providers 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the service providers 105 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
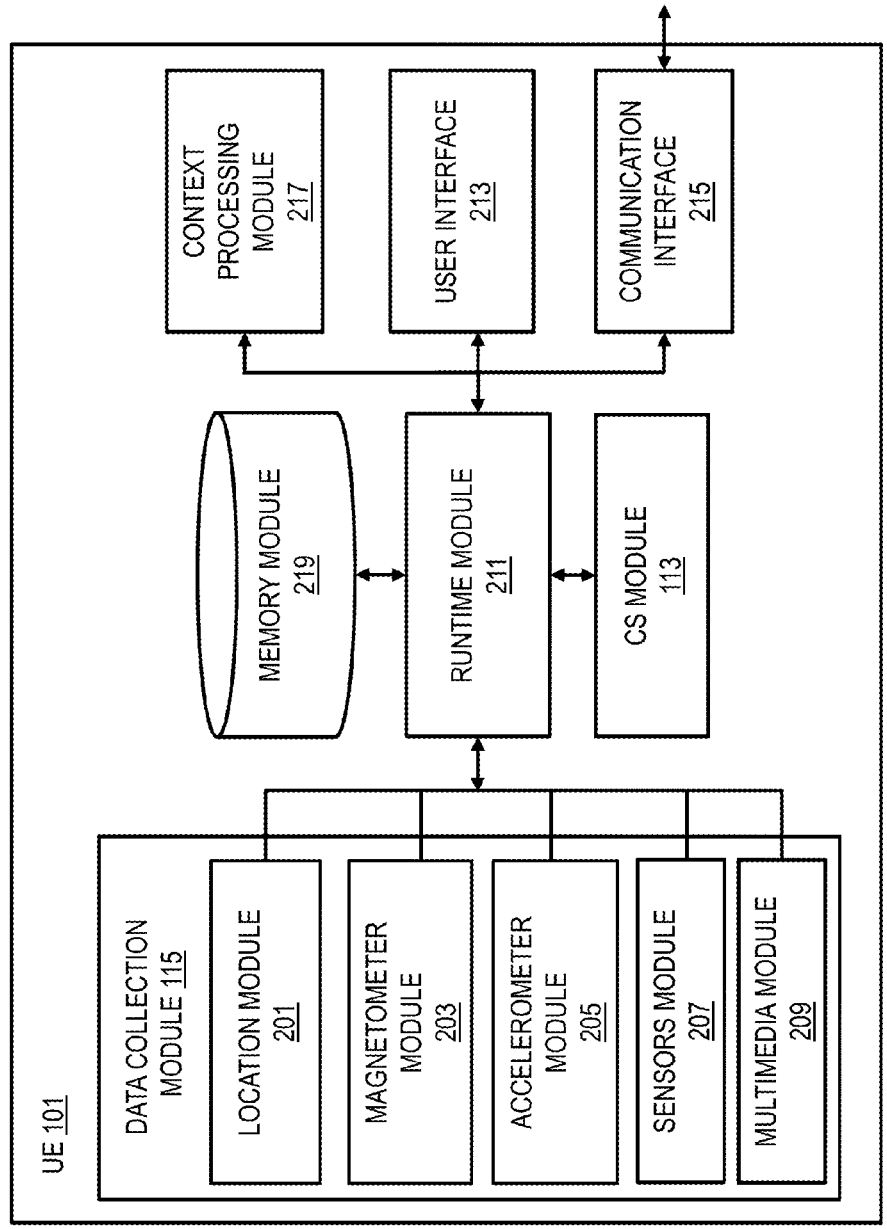
FIG. 2 is a diagram of components of a user equipment capable of content sharing, according to an embodiment.

FIG. 2 is a diagram of the components of a user equipment capable of content sharing, according to an embodiment. By way of example, a UE 101 includes one or more components for receiving, generating, capturing, and/or scanning of an encoded data representation for sharing one or more content items from a first device to one or more other devices. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the CS module 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider to further processing, storage, sharing, and the like. For example, a captured image of a graphical encoded data representations may be submitted to a service provider and/or the context processing module 217 for analysis and/or decoding. In one embodiment, the multimedia module 209 may also be utilized to scan a graphical encoded data representation, which may be associated with one or more content items for sharing via one or more local and/or remote service providers.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the CS module 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate one or more available data items with one or more content items available from the one or more modules/components of the UE 101. For example, date, time, location, and user information associated with a device at a particular time may be associated (e.g., as metadata) with an image that is captured by the UE 101 at that particular time.

Figure 3:
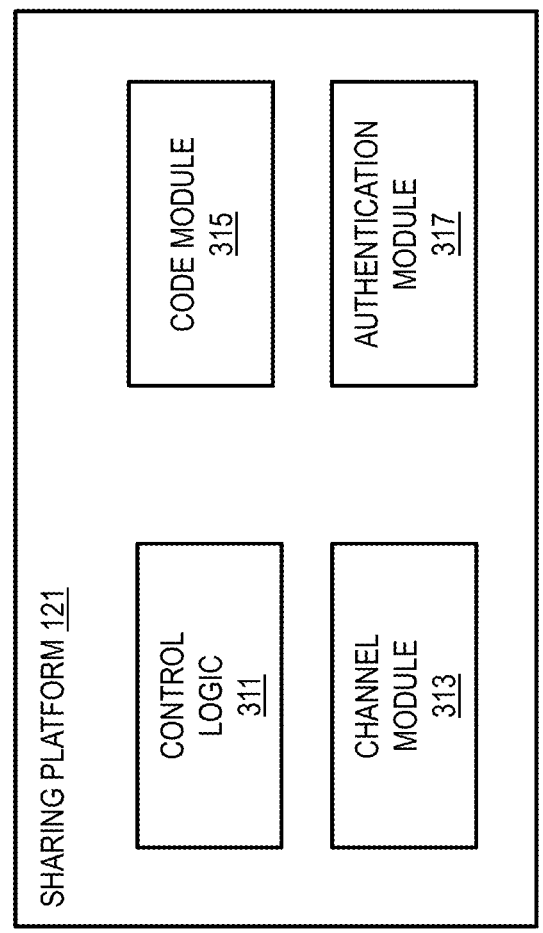
FIG. 3 is a diagram of components of a sharing platform, according to an embodiment.

FIG. 3 is a diagram of the components of the sharing platform, according to an embodiment. By way of example, the sharing platform 121 includes one or more components for facilitating sharing of various content items among a plurality of devices in the system 100. It is contemplated that the functions of these components may be combined in one or more components or performed by other components of equivalent functionality. In this embodiment, the sharing platform 121 includes a control logic 311, channel module 313, code module 315, and an authentication module 317. In one embodiment, the control logic 311 and channel module 313 may manage one or more content channels at one or more service providers, content providers, servers, and the like. As previously discussed, a content channel may be established whereby a plurality of users may share one or more content items with one or more other users. In one embodiment, an encoded data representation may be utilized to effectuate the sharing of the one or more content items. In one embodiment, a user may utilize an application and/or a module wherein configuration information of a content channel, user information, user preferences, and the like may be predefined. Alternately, the sharing platform 121 may determine all or partial configuration information based on available resources at the system 100.

In one embodiment, the control logic 311 and the channel module 313 may receive a request/input from a user for sharing one or more content items among users, wherein the channel module 313 may determine one or more parameters associated with the user preferences, user history, content type for sharing, a service provider, and the like. Further, the channel module 313 may utilize a predefined dedicated content channel or may determine a suitable channel based, at least in part, on the determined parameters and information.

In one embodiment, the control logic 311 and the code module 315 may cause a generation and/or a decoding of one or more encoded data representations associated with one or more content items. In one embodiment, the code module 315 may generate an encoded data representation for one or more content items available for sharing at a device. For example, the code module 315 may process a request from a first device for sharing one or more content items available for sharing and further generate one or more encoded data representations for the one or more content items. In one embodiment, the one or more encoded data representations are transmitted to the first device (e.g., a device wishing to share one or more content items.) In one embodiment, the code module 315 may decode an encoded data representation (e.g., received from second device), which may be associated with one or more content items available at a device (e.g., a first device.) For example, the code module 315 may receive an encoded data representation from a second device, which may be requesting to receive and/or view one or more content items associated with the encoded data representation. In one embodiment, the one or content items to be shared, may be available at a first device, at a service provider, at a local storage, at a remote storage, and the like.

In one embodiment, the control logic 311 and authentication module 317 may cause an authentication of users/devices for access to the content. For example, the control logic 311 and the authentication module 317 may process an encoded data representation submitted by a user which is to be a key for accessing one or more content items. In one embodiment, the authentication module 317 may utilize one or more algorithms, software applications, modules, and the like for decoding an encoded data representation associated with one or more content items to be shared among a plurality of devices. For example, the encoded data representation may be a QR code, which may be associated with a content item available at a first device, wherein the content item is to be transferred and/or presented at a second device.

Figure 4:
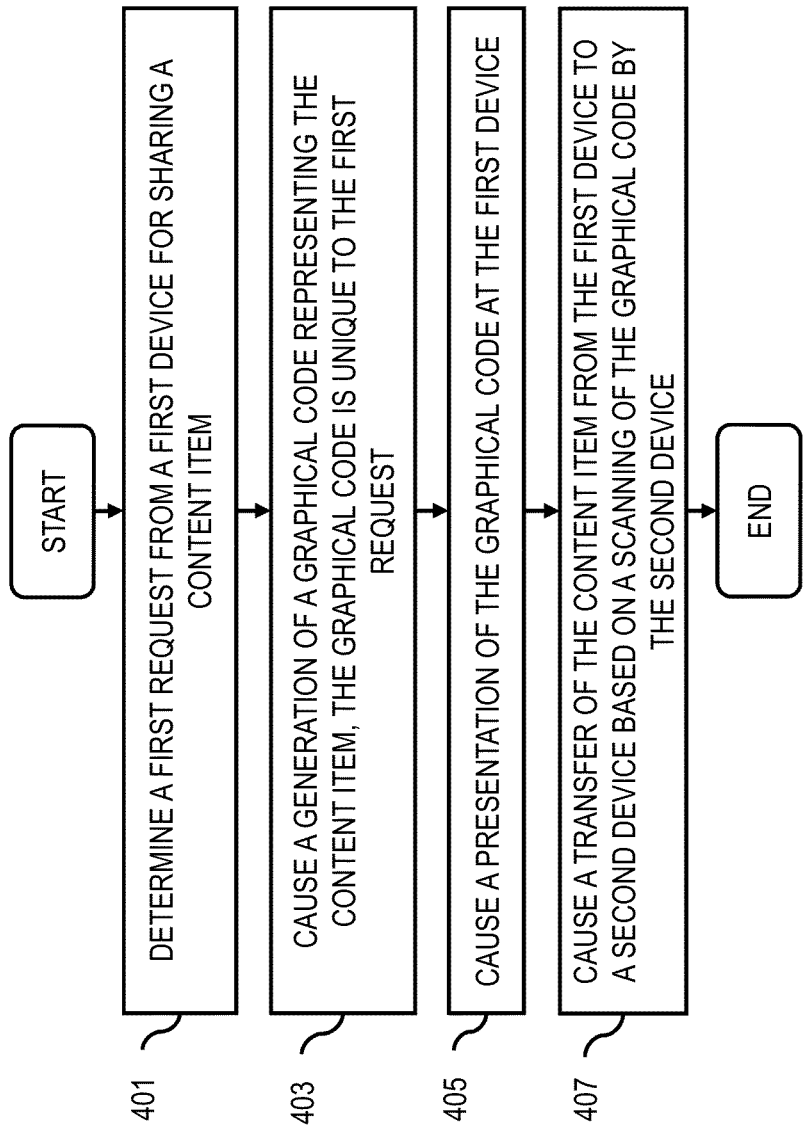
FIGS. 4 and 5 illustrate flowcharts of various processes for, at least, sharing one or more content items, according to various embodiments.
Figure 5:
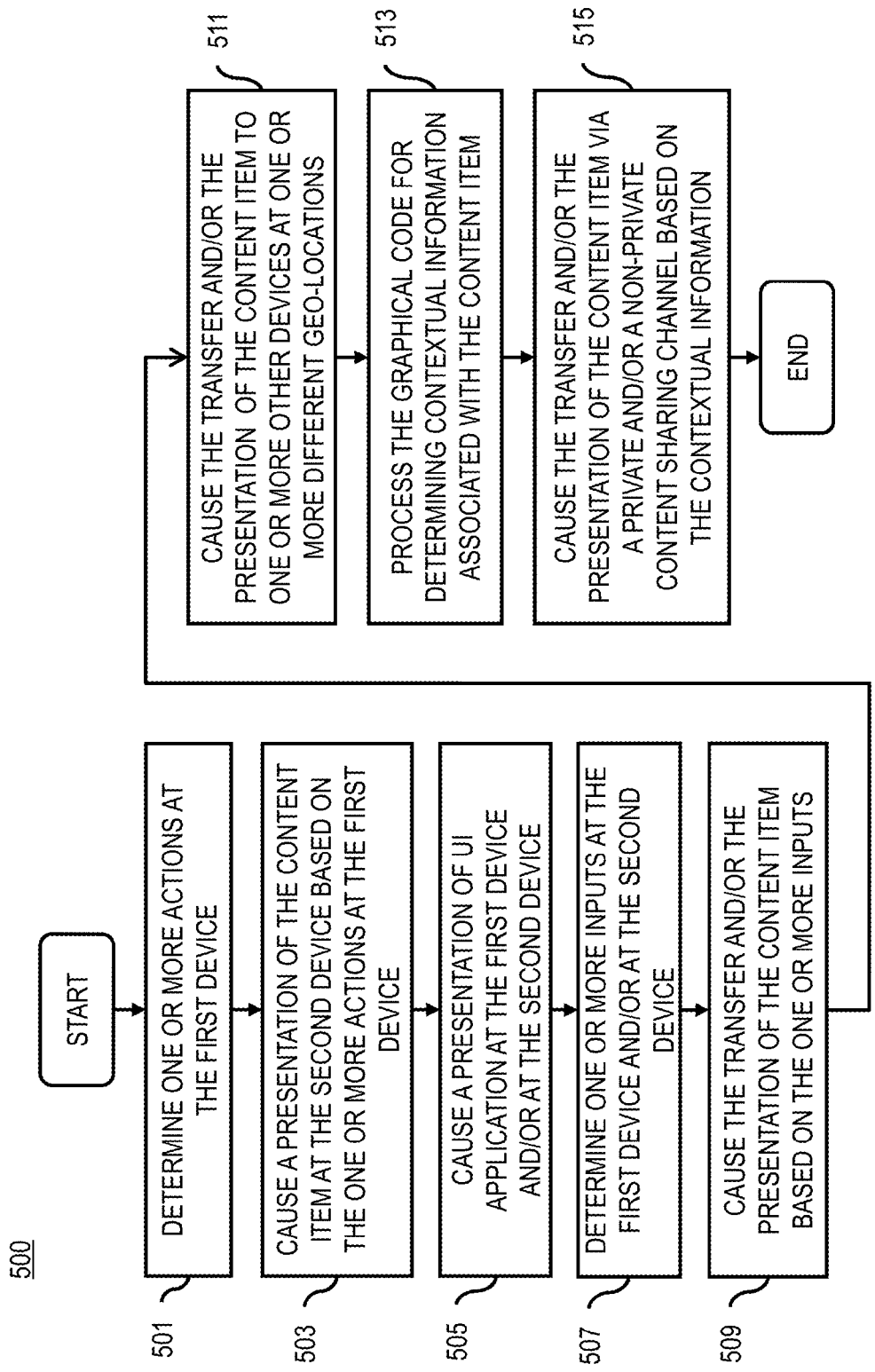
Figure 9:
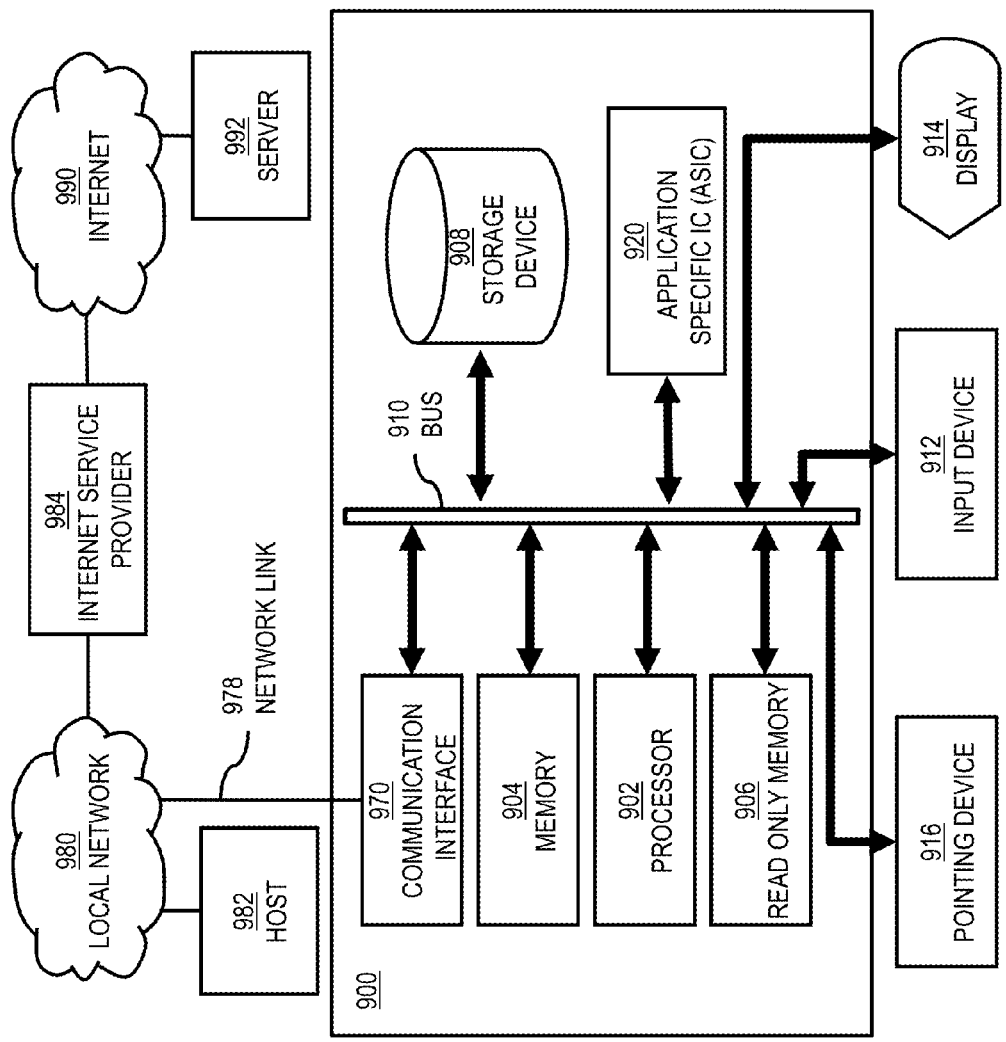
FIG. 9 is a diagram of hardware that can be used to implement an embodiment of the invention.

FIGS. 4 and 5 illustrate flowcharts of various processes for, at least, sharing one or more content items, according to various embodiments. In various embodiments, a the sharing platform 121 and/or the CS module 113 may perform processes 400 and 500 that may be implemented in, for instance, a chip set including a processor and a memory as shown in FIG. 9. As such, the sharing platform 121 and the CS module 113 can provide means for accomplishing various parts of the process 400 and 500 as well as means for accomplishing other processes in conjunction with other components of the system 100. Throughout this process, the sharing platform 121 and the CS module 113 may be referred to as completing various portions of the processes 400 and 500, however, it is understood that other components of the system 100 can perform some of and/or all of the process steps. Further, in various embodiments, the sharing platform 121 and/or the CS module 113 may be implemented in one or more entities of the system 100.

Referring to FIG. 4, the process 400 begins at step 401 where the sharing platform 121 and/or the CS module 113 determine a first request from a first device for sharing at least one content item. In one embodiment, a service provider may receive a request from a first device where a user of the first device wishes to share a content item with another user via a second device. For example, the first user selects a photo from a photo album on a first device and/or at a remote storage and utilizes an application and/or a user interface option on the first device to indicate that he wishes to share the photo with a second user (e.g., via a second device.) In one embodiment, the request may be received at a sharing platform, which may facilitate sharing of various content items among a plurality of users via one or more service providers 105 and/or content providers 107 (e.g., cloud services.) In one embodiment, a service provider 105 may be predefined at a user device and/or may be defined by the service platform facilitating the sharing.

In step 403, the sharing platform 121 and/or the CS module 113 causes, at least in part, a generation of a graphical code representing, at least in part, the at least one content item, wherein the graphical code is unique to the first request. In one embodiment, the graphical code includes a one dimensional graphical code, a two dimensional graphical code, or a combination thereof. In one embodiment, a sharing platform and/or a service provider may generate or cause a generation of a unique graphical code (a marker) (e.g., a bar code, a QR code, a numerical pattern, etc.) representing the content item to be shared. In one embodiment, one or more applications and/or modules at a first user device may generate a complete or a partial marker and further cause a displaying on the first device. In various embodiments, the graphical code representation (the marker) may be of various types of one dimensional and/or two dimensional barcodes, which may include encoded data associated with an object (e.g., physical, virtual, digital, etc.), wherein the encoded data may be decoded by a decoding device. In one example, a one dimensional barcode may be a series of vertical black lines with white spaces in between, which represent encoded alphanumeric data that may be scanned and decoded by a device capable of doing so (e.g., a barcode reader.) Further, the two dimensional barcodes (also referred to as a matrix barcode) may include a range of graphical code representations (e.g., lines, dots, shapes, patterns, etc. in x-axis and y-axis directions) that may include encoded alphanumeric data associated with an object, wherein the data may indicate a website URL, a map geo-location, a contact information, text notes, product identification, and the like. For example, the two dimensional barcodes may include various versions of graphical representations in color, grey scale, and black and white, where the graphical pattern may be in a variety of geometrical forms and dimensions. In one embodiment, a barcode may include an alphanumeric pattern which may be arranged in a matrix format. In one embodiment, the graphical code includes a URL reference/address associated with one or more content items.

In step 405, the sharing platform 121 and/or the CS module 113 cause, at least in part, a presentation of the graphical code at the first device. In one embodiment, a service provider may generate the graphical code and cause for it to be presented/displayed at the first device. In one embodiment, a service provider may transmit a code (e.g., an alphanumeric code) to the first device, wherein the first device may further utilize the code to generate and display a graphical code at the first device. In one embodiment, the first device may partially or completely generate and display the graphical code at the first device.

In step 407, the sharing platform 121 and/or the CS module 113 causes, at least in part, a transfer of the at least one content item from the first device to a second device based, at least in part, on a scanning of the graphical code by the second device. In one embodiment, a first device displays a graphical code and a second device scans and/or captures an image of the graphical code, for example, via a barcode scanner and/or via a camera device on the second device. In one embodiment, one or more components of the system 100 (e.g., a service provider, a service platform, etc.) may receive a scanned/captured graphical code from the second device. In one embodiment, the graphical code may be partially or completely decoded by the second device, for example, one or more applications on the second device may decode one or more portions of the graphical code and submit the decoded data to the one or more components of the system 100. In one instance, the second device may decode a graphical code and utilize the decoded data to perform one or more actions, for example, contact a certain service provider (e.g., Flickr®, Google®, Yahoo®, etc.), or connect to a certain network resource (e.g., a network server at a certain IP address), use an internet browser to connect to a certain website, and the like. In one embodiment, the at least one content item is stored at the first device, at a server, or a combination thereof. In one embodiment, a service provider may transfer to and/or present at the second device, the content item which the first device intended to share with the second device. In one embodiment, a service provider may request the content item from the first device to directly transfer to and/or present at the second device. In one embodiment, the service provider may request for and store the content item at the service provider before transferring to and/or presentation at the second device.

In one embodiment, the graphical code includes one or more information items associated with the first device, with the server, or a combination thereof. In one embodiment, the first device and/or a service provider may determine and include one or more information items associated with the first device, with the user of the first device, with a service provider associated with the first device and/or the first user, and the like. For example, the graphical code may indicate a type of the first device, who the user of the first device is, a server where the content item may be stored at, a server which may be transferring/presenting the content item, and the like.

Referring to FIG. 5, the process 500 begins at step 501 where the sharing platform 121 and/or the CS module 113 determine one or more actions at the first device. In one embodiment, an application at the first device and/or a service provider may determine an action by a user of the first device associated with a content item. For example, a first user at the first device may select one or more additional content items at the first device to be shared with the second device while a first content item is being transferred to and/or presented at a second device. In one example, the first user may browse through additional content items at the first device (e.g., more photos in an album, etc.), which may also be shared with the second user via the second device.

In step 503, the sharing platform 121 and/or the CS module 113 causes, at least in part, a presentation of the at least one content item at the second device based, at least in part, on the one or more actions at the first device. For example, the application at the first device and/or the service provider may present the additional content items at the second device.

In step 505, the sharing platform 121 and/or the CS module 113 causes, at least in part, a presentation of a user interface application at the first device, at the second device, or a combination thereof. In one embodiment, a service provider, in response to a request for sharing a content item from a first device to a second device, may present a UI application at the first device and/or at the second device. In one embodiment, the service provider may cause one or more applications at the first device and/or at the second device to present the UI application.

In step 507, the sharing platform 121 and/or the CS module 113 determines one or more inputs at the first device, at the second device, or a combination thereof. In one embodiment, the service provider and/or one or more applications at the first device and/or at the second device may determine one or more inputs, for example, from a first user, from a second user, from one or more applications, and the like, which may select one or more content items for sharing, for transfer, for presentation, and the like.

In step 509, the sharing platform 121 and/or the CS module 113 causes, at least in part, the transfer, the presentation, or a combination thereof of the at least one content item based, at least in part, on the one or more inputs. In one embodiment, a service provider may effectuate the transfer and/or presentation of one or more content items from a first device to a second device based, at least in part, on one or more inputs from the first user and/or the second user. For example, the first user may wish to discontinue sharing of content items, or to add more content items to a current sharing session, and the like. In one example, the second user may wish to receive additional content items from the first device, or request for a re-transmission of a content item, or request for a different version (e.g., a different file size, a different format, etc.) of a content item, and the like.

In step 511, the sharing platform 121 and/or the CS module 113 causes, at least in part, the transfer, the presentation, or a combination thereof of the content item to one or more other devices at one or more different geo-locations. In one embodiment, a service provider may receive a request from a first user and/or from a second user for sharing a content item with one or more users/devices that may be located at a different geo-location than the first and/or the second device. For example, the content item may be shared with a third device (e.g., a monitor, a television set, etc.) which may be in communication with the system 100. In one embodiment, the content item may be transferred and/or presented to one or more devices at different locations at one or more different times.

In step 513, the sharing platform 121 and/or the CS module 113 processes and/or facilitates a processing of the graphical code for determining contextual information associated with the at least one content item, wherein the transfer, the presentation, or a combination thereof of the at least one content item to the second device is based, at least in part, on the contextual information. In one embodiment, a service provider may decode the graphical code to determine contextual data associated with a content item to be shared, wherein the contextual data may include metadata, content type, and the like. In one embodiment, a first device may determine the contextual data. In one embodiment, a second device may process the graphical code and determine the contextual data. In one embodiment, a service provider, a first device, and/or a second device may effectuate the transfer to and/or presentation of the content item at the second device based, at least in part, on the contextual data. For example, the contextual data may indicate that the content item may be for private use, may not be shared, may be shared with certain other users, file size may be too large for transfer/presentation via a given method, and the like.

In step 515, the sharing platform 121 and/or the CS module 113 causes, at least in part, the transfer, the presentation, or a combination thereof of the at least one content item via a private content sharing channel, a non-private content sharing channel, or a combination thereof based, at least in part, on the contextual information. In one embodiment, a first device, a second device, and/or a service provider may determine to transfer and/or present a content item via a private content sharing and/or communication channel. In one embodiment, the content item may be shared with a public, a semi-private, secure, or a combination thereof sharing and/or communication channel. In one embodiment, the contextual data may be utilized for determining the type of sharing and/or communication channel to be utilized for the transfer and/or presentation of the content item at the second device. For example, content items including privacy information may be determined for sharing via a private and/or secure channel. In one embodiment, a first user initiating the sharing may identify/request a certain channel for sharing a certain content item.

Figure 6:
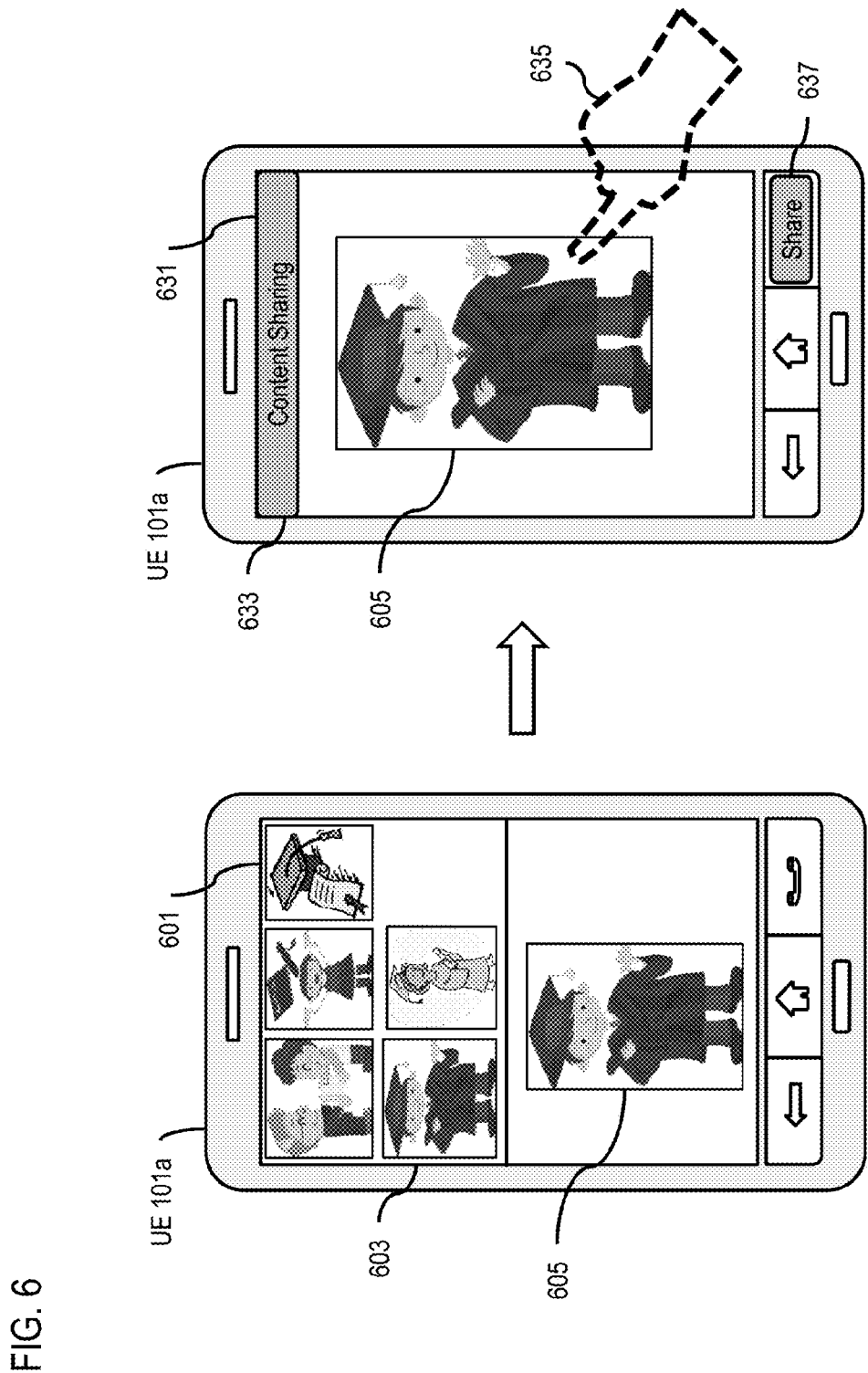
FIGS. 6-8 illustrate example user interface diagrams utilized in the processes of the FIGS. 4 and 5, according to various embodiments.
Figure 7:
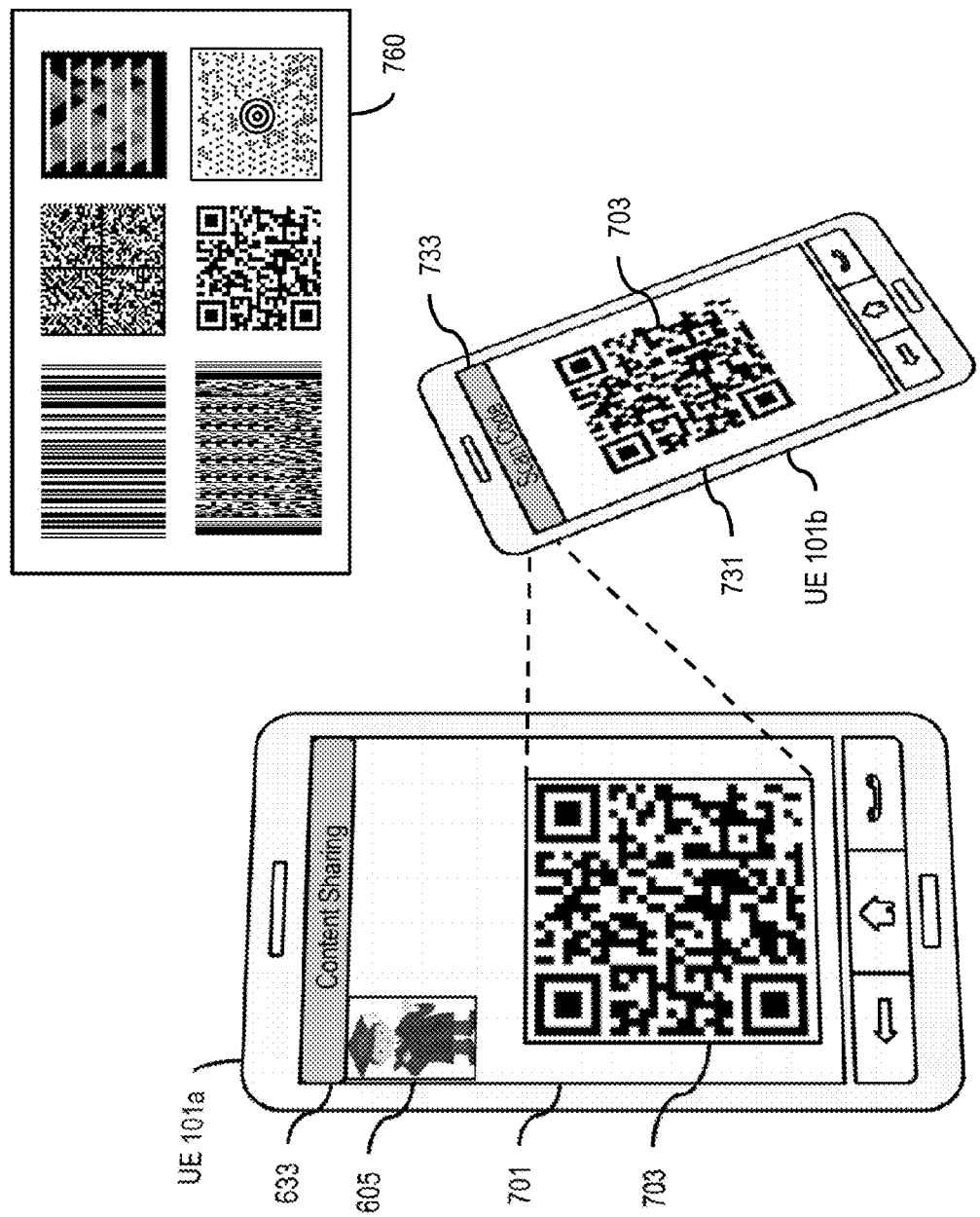
Figure 8:
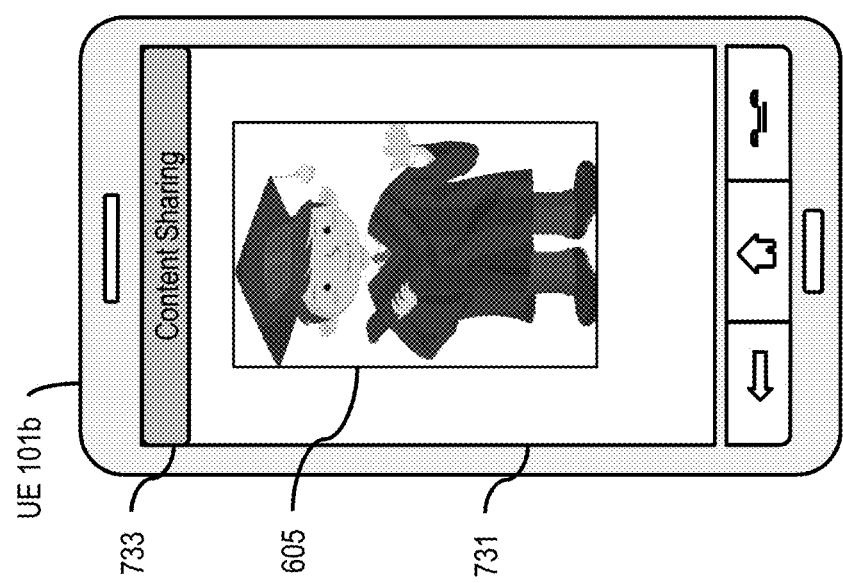

FIGS. 6-8 illustrate example UI diagrams utilized in the processes of the FIGS. 4 and 5, according to various embodiments.

FIG. 6 includes example UI illustrations 601 and 631 on a UE 101a. As shown, In one embodiment, a first user may utilize the UI 601 of the UE 101a to initiate a sharing of one or more content items in 603, wherein the content items may be available at the UE 101a and/or at a remote storage. In one instance, the first user may select the content item 605 for sharing with one or more other users. Further, in one embodiment, the first user may utilize a content sharing application 633 (e.g., a photobeamer) and/or the CS module 113 at the UE 101a to highlight and/or select the content item 605 and to cause a request to the sharing platform 121 a service provider 105, and/or a content provider 107, which may indicate that the first user wishes to share the content item 605 with another user. In one embodiment, the first user may indicate that the content item 605 is for sharing by selecting, touching, and/or holding (e.g., for some activation time, one-to-two seconds, etc.) a UI selection feature via 635, 637, and the like.

Referring to FIG. 7 now, illustrated are UI 701 on the UE 101a and UI 731 on a UE 101b. In one embodiment, the sharing platform 121 and/or a service provider 105 may generate and present at the UE 101a an encoded data representation 703 (e.g., a QR code), which may include one or more information items associated with the content item 605, the UE 101a, the first user, the sharing platform 121, a service provider 105, a content provider 107, and/or one or more network elements of the system 100. In one embodiment, one or more applications at UE 101a, the CS module 113, and the like may generate the encoded data representation 703, which may include one or more predefined parameters associated with one or more network elements of the system 100 for effectuating sharing of the content item 605. In one embodiment, the encoded data representation 703 may include one or more encoded data representations of the list 760, wherein the encoded data representation may be one dimensional or two dimensional graphical representations. For example, the list 760 illustrates a barcode, a QR code, a matrix code, a stacked code, a color-coded geometrical code, and the like, which are only examples of various graphical representations of encoded data. In various embodiments, an encoded data representation 703 may include a unique URL address, which may point to a specific network location, whereat one or more users may access one or more content items. In one embodiment, a second user may utilize an application 733 (e.g., CS module 113) via the UI 731 at the UE 101b to scan and/or capture the encoded data representation 703 at the UE 101a. In one embodiment, the UE 101b causes a transmission of the scan and/or the capture of the encoded data representation 703 to the sharing platform 121, a service provider 105, and/or a content provider 107. In one embodiment, the sharing platform 121, a service provider 105, and/or a content provider 107 may cause a transfer of and/or a presentation of the content item 605 at the UE 101b. In one embodiment, the applications 103 and/or the CS module 113 may decode the encoded data representation 703 for determining an access point in the system 100 whereat the content item 605 may be available for access (e.g., view, download, etc.)

Referring to FIG. 8 now, the sharing platform 121, a service provider 105, and/or a content provider 107 may cause a transfer and/or a presentation of the content item 605 at the UE 101b. In one embodiment, the UE 101b may decode one or more information items in the encoded data representation 703 for accessing the content item 605. For example, the UE 101b may determine the URL address and utilize the applications 103 for accessing the URL address. In one embodiment, the content item 605 may be stored at the UE 101a and may only be retrieved and transferred to the UE 101b upon decoding the encoded data representation 703. In one embodiment, the content item 605 may be stored at a service provider 105 and/or a content provider 107 for future availability to one or more users/devices.

The processes described herein for a more efficient and user friendly mechanism for sharing content among users may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) for a more efficient and user friendly mechanism for sharing content among users to as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps for a more efficient and user friendly mechanism for sharing content among users.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to a more efficient and user friendly mechanism for sharing content among users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for a more efficient and user friendly mechanism for sharing content among users. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for a more efficient and user friendly mechanism for sharing content among users, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 111 for a more efficient and user friendly mechanism for sharing content among users.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
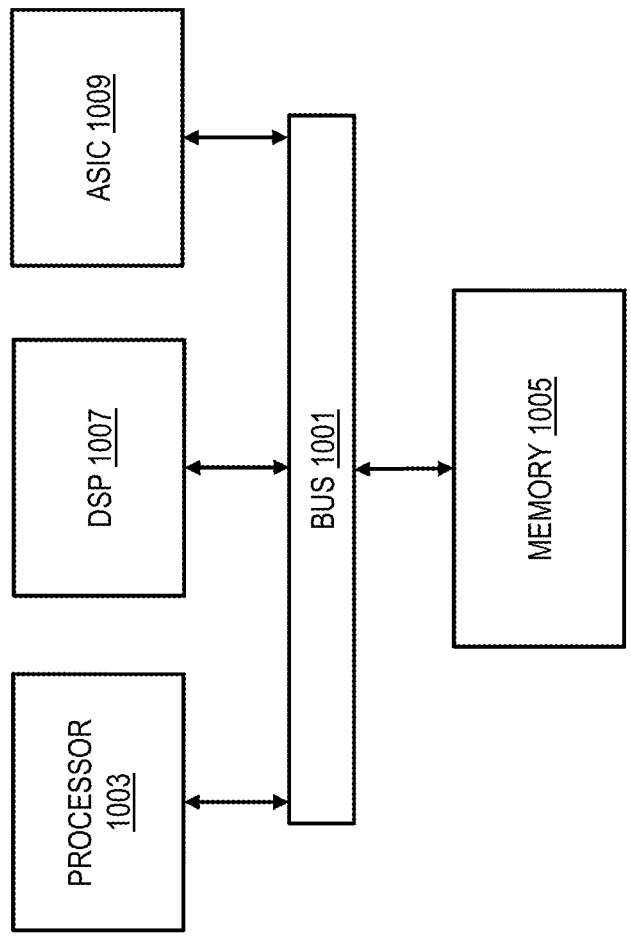
FIG. 10 is a diagram of a chip set that can be used to implement an embodiment of the invention.

FIG. 10 illustrates a chip set or chip 1000 upon which an embodiment of the invention may be implemented. Chip set 1000 is programmed for a more efficient and user friendly mechanism for sharing content among users as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps for a more efficient and user friendly mechanism for sharing content among users.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for a more efficient and user friendly mechanism for sharing content among users. The memory 1005 also stores the data associated with or generated by the execution of the inventive steps.

Figure 11:
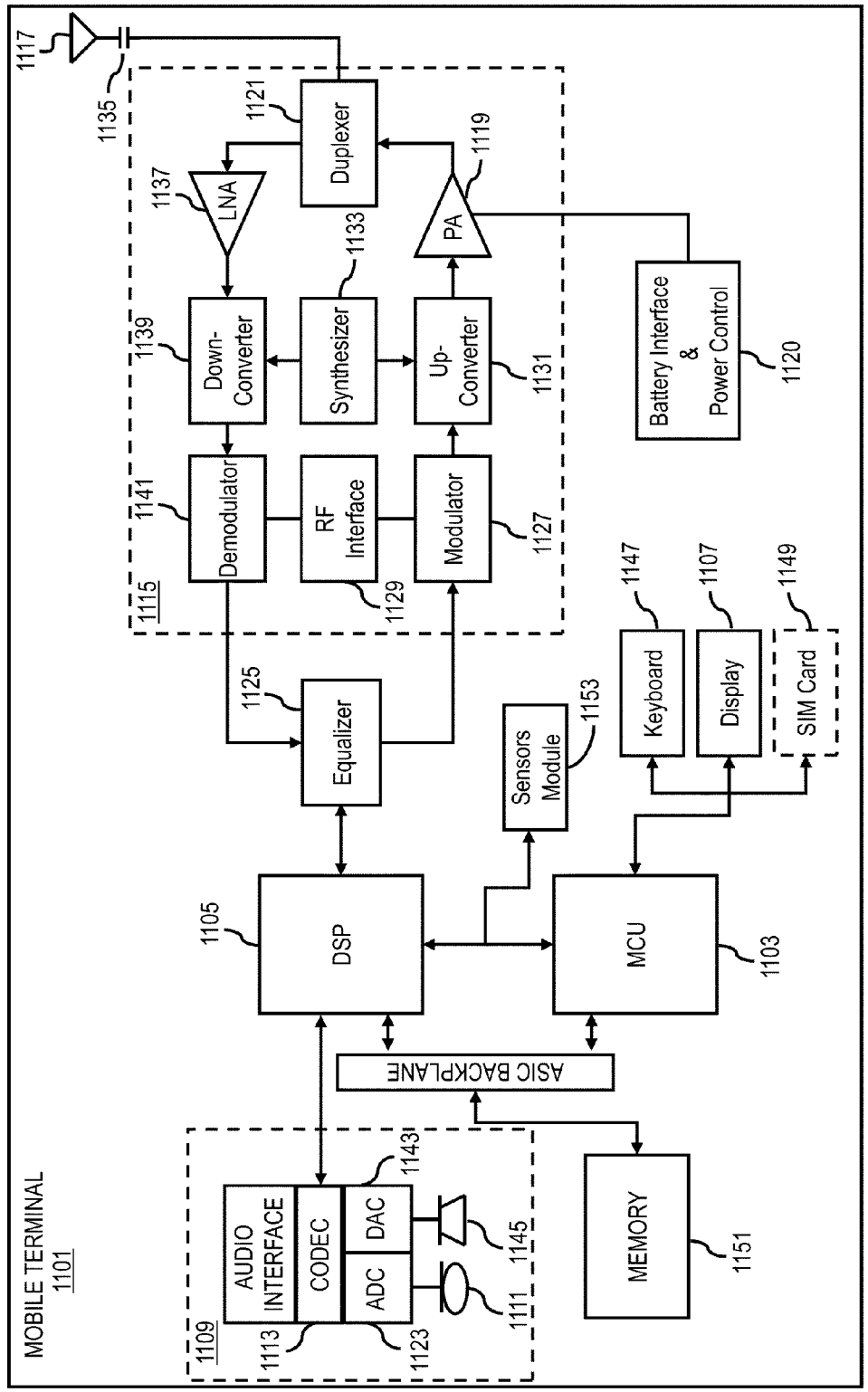
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps for a more efficient and user friendly mechanism for sharing content among users. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps for a more efficient and user friendly mechanism for sharing content among users. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for a more efficient and user friendly mechanism for sharing content among users. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, a first request received via a network from a first device for sharing at least one content item;
   in response to the first request, initiating, by the apparatus, a generation of a graphical code representing, at least in part, the at least one content item;
   initiating, by the apparatus, a presentation of the graphical code at the first device;
   receiving, by the apparatus via the network from a second device, the graphical code scanned by the second device;
   initiating, by the apparatus, a transfer of the at least one content item via a communication channel of the network to the second device based, at least in part, on the graphical code scanned by the second device; and
   initiating, by the apparatus, a presentation of the at least one content item at the second device.

2. A method of claim 1, wherein the graphical code includes a one dimensional graphical code, a two dimensional graphical code, or a combination thereof, and wherein the communication channel is a website.

3. A method of claim 1, wherein the at least one content item is stored at the first device, at a server, or a combination thereof, wherein the transfer and the presentation of the at least one content item are initiated without user intervention on the second device.

4. A method of claim 3, wherein the graphical code includes one or more information items associated with the first device, with the server, or a combination thereof, wherein the communication channel is an online shopping website, a social networking website, or a blogging web site.

5. A method of claim 1, further comprising:
   determining one or more actions at the first device, wherein the one or more actions include discontinuing the sharing of the at least one content item, adding one or more other content items to the sharing,
   wherein the presentation of the at least one content item at the second device is based, at least in part, on the one or more actions at the first device.

6. A method of claim 5, further comprising:
   initiating a presentation of a user interface application at the first device, at the second device, or a combination thereof; and
   determining one or more inputs at the first device, at the second device, or a combination thereof,
   wherein the transfer, the presentation, or a combination thereof of the at least one content item is based, at least in part, on the one or more inputs.

7. A method of claim 6, wherein the transfer, the presentation, or a combination thereof of the content item to one or more other devices are at one or more different geo-locations.

8. A method of claim 1, further comprising:
   receiving, by the apparatus, a request from the second device for a different version of the at least one content item; and
   initiating, by the apparatus, a transfer of the different version of the at least one content item via the communication channel to the second device in response to the request,
   wherein the graphical code includes a uniform resource locator reference associated with the one or more content items.

9. A method of claim 1, further comprising:
   processing the graphical code for determining contextual information associated with the at least one content item,
   wherein the transfer, the presentation, or a combination thereof of the at least one content item to the second device is based, at least in part, on the contextual information.

10. A method of claim 9, wherein the transfer, the presentation, or a combination thereof of the at least one content item via a private content sharing channel, a non-private content sharing channel, or a combination thereof are based, at least in part, on the contextual information.

11. An apparatus comprising:
at least one processor; and
at least one memory including computer program code for one or more programs, the at least one memory and the computer program code configured to, with the at least one processor, cause the apparatus to perform at least the following,
determine a first request received via a network from a first device for sharing at least one content item;
in response to the first request, initiate a generation of a graphical code representing, at least in part, the at least one content item;
initiate a presentation of the graphical code at the first device;
receive via the network from a second device, the graphical code scanned by the second device;
initiate a transfer of the at least one content item via a communication channel of the network to the second device based, at least in part, on the graphical code scanned by the second device; and
initiate a presentation of the at least one content item at the second device.

12. An apparatus of claim 11, wherein the graphical code includes a one dimensional graphical code, a two dimensional graphical code, or a combination thereof.

13. An apparatus of claim 11, wherein the at least one content item is stored at the first device, at a server, or a combination thereof.

14. An apparatus of claim 13, wherein the graphical code includes one or more information items associated with the first device, with the server, or a combination thereof.

15. An apparatus of claim 11, wherein the apparatus is further caused to:
determine one or more actions at the first device,
wherein the presentation of the at least one content item at the second device is based, at least in part, on the one or more actions at the first device.

16. An apparatus of claim 15, wherein the apparatus is further caused to:
initiate a presentation of a user interface application at the first device, at the second device, or a combination thereof;
determine one or more inputs at the first device, at the second device, or a combination thereof; and
cause, at least in part, the transfer, the presentation, or a combination thereof of the at least one content item based, at least in part, on the one or more inputs.

17. An apparatus of claim 16, wherein the apparatus is further caused to:
cause, at least in part, the transfer, the presentation, or a combination thereof of the content item to one or more other devices at one or more different geo-locations.

18. An apparatus of claim 11, wherein the graphical code includes a uniform resource locator reference associated with one or more content items.

19. An apparatus of claim 11, wherein the apparatus is further caused to:
process the graphical code for determining contextual information associated with the at least one content item,
wherein the transfer, the presentation, or a combination thereof of the at least one content item to the second device is based, at least in part, on the contextual information.

20. An apparatus of claim 19, wherein
the transfer, the presentation, or a combination thereof of the at least one content item via a private content sharing channel, a non-private content sharing channel, or a combination thereof are based, at least in part, on the contextual information.

* * * * *